US011269189B2

(12) United States Patent
Ide et al.

(10) Patent No.: US 11,269,189 B2
(45) Date of Patent: Mar. 8, 2022

(54) IMAGE DISPLAY DEVICE

(71) Applicant: SEIKO EPSON CORPORATION, Tokyo (JP)

(72) Inventors: Mitsutaka Ide, Shiojiri (JP); Masatoshi Yonekubo, Hara-Mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/105,482

(22) Filed: Nov. 25, 2020

(65) Prior Publication Data

US 2021/0165226 A1 Jun. 3, 2021

(30) Foreign Application Priority Data

Nov. 29, 2019 (JP) .................................. 2019-216448

(51) Int. Cl.
*G02B 27/01* (2006.01)
*G02B 26/08* (2006.01)

(52) U.S. Cl.
CPC ..... *G02B 27/0172* (2013.01); *G02B 26/0833* (2013.01); *G02B 27/0179* (2013.01); *G02B 2027/0178* (2013.01); *G02B 2027/0187* (2013.01)

(58) Field of Classification Search
CPC .... G02B 2027/0178; G02B 2027/0187; G02B 26/0833; G02B 27/0172; G02B 27/0179
See application file for complete search history.

(56) References Cited

U.S. PATENT DOCUMENTS

| 9,664,824 B2* | 5/2017 | Simmonds | G02F 1/295 |
| 11,061,231 B2* | 7/2021 | Oku | G02B 6/005 |
| 2010/0039796 A1* | 2/2010 | Mukawa | G02B 27/0081 |
| | | | 362/97.1 |
| 2013/0128611 A1* | 5/2013 | Akutsu | G03H 1/0248 |
| | | | 362/607 |
| 2015/0338660 A1* | 11/2015 | Mukawa | G02B 5/0278 |
| | | | 359/13 |

(Continued)

FOREIGN PATENT DOCUMENTS

| JP | 2012163642 | 8/2012 |
| JP | 2015213226 | 11/2015 |

(Continued)

*Primary Examiner* — Dmitriy Bolotin
(74) *Attorney, Agent, or Firm* — JCIPRNET

(57) ABSTRACT

An image display device includes an image light generation device configured to generate image light, and a deflection member configured to deflect the image light to form an exit pupil, in which the image light generation device includes a first light source unit configured to emit first light, a second light source unit configured to emit second light within a same frequency band as the first light and having a wavelength band different from a wavelength band of the first light, and a combining optical member configured to at least partially superimpose the first light and the second light, the deflection member includes a first diffraction member corresponding to the wavelength band of the first light and a second diffraction member corresponding to the wavelength band of the second light, and the first diffraction member and the second diffraction member overlap when viewed from the exit pupil.

9 Claims, 7 Drawing Sheets

(56) References Cited

U.S. PATENT DOCUMENTS

| | | | |
|---|---|---|---|
| 2016/0154150 A1* | 6/2016 | Simmonds | G02B 5/1842 |
| | | | 385/37 |
| 2016/0154243 A1* | 6/2016 | Aiki | G02B 27/0176 |
| | | | 359/633 |
| 2016/0202485 A1* | 7/2016 | Yamada | G02B 26/10 |
| | | | 345/8 |
| 2018/0151194 A1* | 5/2018 | Noguchi | G11B 7/1353 |
| 2018/0275350 A1* | 9/2018 | Oh | G02B 27/0172 |
| 2018/0322845 A1* | 11/2018 | Machida | G02B 26/026 |
| 2019/0146221 A1* | 5/2019 | Oku | G02B 6/0026 |
| | | | 359/13 |
| 2019/0235266 A1 | 8/2019 | Ide et al. | |
| 2019/0339447 A1* | 11/2019 | Shipton | G02B 27/0081 |
| 2019/0339449 A1* | 11/2019 | Shipton | G02B 27/4272 |
| 2020/0116995 A1* | 4/2020 | Chi | G02B 27/0081 |
| 2020/0117005 A1* | 4/2020 | Chi | G02B 27/0172 |
| 2021/0033794 A1* | 2/2021 | Puckett | G02B 6/124 |
| 2021/0165226 A1* | 6/2021 | Ide | G02B 26/0833 |
| 2021/0173210 A1* | 6/2021 | Elazhary | G02B 6/0016 |
| 2021/0208396 A1* | 7/2021 | Li | G02B 27/0172 |

FOREIGN PATENT DOCUMENTS

| | | |
|---|---|---|
| JP | 2016085428 | 5/2016 |
| JP | 2016517036 | 6/2016 |
| JP | 2018087949 | 6/2018 |
| JP | 2019133132 | 8/2019 |
| WO | 2014155288 | 10/2014 |

\* cited by examiner

IMAGE DISPLAY DEVICE

The present application is based on, and claims priority from JP Application Serial Number 2019-216448, filed Nov. 29, 2019, the disclosure of which is hereby incorporated by reference herein in its entirety.

BACKGROUND

1. Technical Field

The present disclosure relates to an image display device.

2. Related Art

In recent years, image display devices of a head-mounted type such as a head-mounted display have attracted attention. Such a head-mounted display is designed to form an exit pupil that rays of image light intersect at a pupil position of an observer. In consideration of a change in the pupil position due to eyeball movement when the observer views an image, it is desired for a size of the exit pupil to be expanded to prevent the viewed image from causing missing portions or defects. In JP 2016-517036 T (Translation of PCT Application), a technology for expanding the size of the exit pupil is disclosed, in which a MEMS mirror is caused to scan light rays emitted from a plurality of light sources with different wavelengths, while collimating the light rays, with shifting timings for each of the light sources to generate pupils at a plurality of positions.

Unfortunately, in the technology of JP 2016-517036 T, an image light generation device grows in size because 21 pieces of the laser light sources are required per one eye when providing seven pieces of the exit pupils, for example. In addition, it is necessary to compensate for a distortion and the like of the image light because an incident angle of the image light varies depending on positions of the exit pupils, and, a processing using a large-scale CPU is required when providing the plurality of pupils as described above. When providing a space for installing the large-scale CPU, there is a risk that the device configuration may further grow in size.

SUMMARY

In order to resolve the above-described issue, a first aspect of the present disclosure provides an image display device including an image light generation device configured to generate image light, and a deflection member of a reflective-type configured to deflect the image light emitted from the image light generation device to form an exit pupil, in which the image light generation device includes a first light source unit configured to emit first light, a second light source unit configured to emit second light that is within a same frequency band as the first light and has a wavelength band different from a wavelength band of the first light, and a combining optical member configured to at least partially superimpose the first light and the second light, in which the deflection member includes a first diffraction member including a first diffraction element corresponding to the wavelength band of the first light and a second diffraction member including a second diffraction element corresponding to the wavelength band of the second light, and in which the first diffraction member and the second diffraction member overlap when viewed from the exit pupil.

DESCRIPTION OF EXEMPLARY EMBODIMENTS

First Embodiment

Embodiments of the present disclosure will be described below with reference to the accompanying drawings. Note that, in each of the drawings below, to make each of layers and each of members a recognizable size, each of the layers and each of the members are illustrated to be different from an actual scale and an actual angle.

Figure 1:
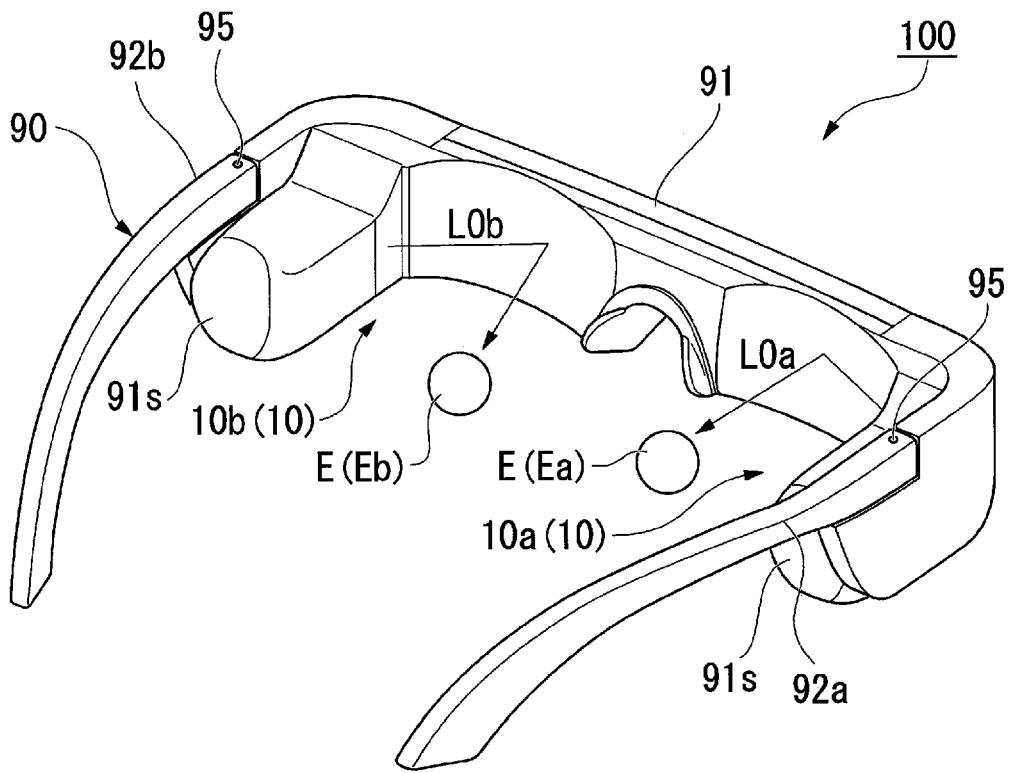
FIG. 1 is an external view of an image display device of a first embodiment.
Figure 2:
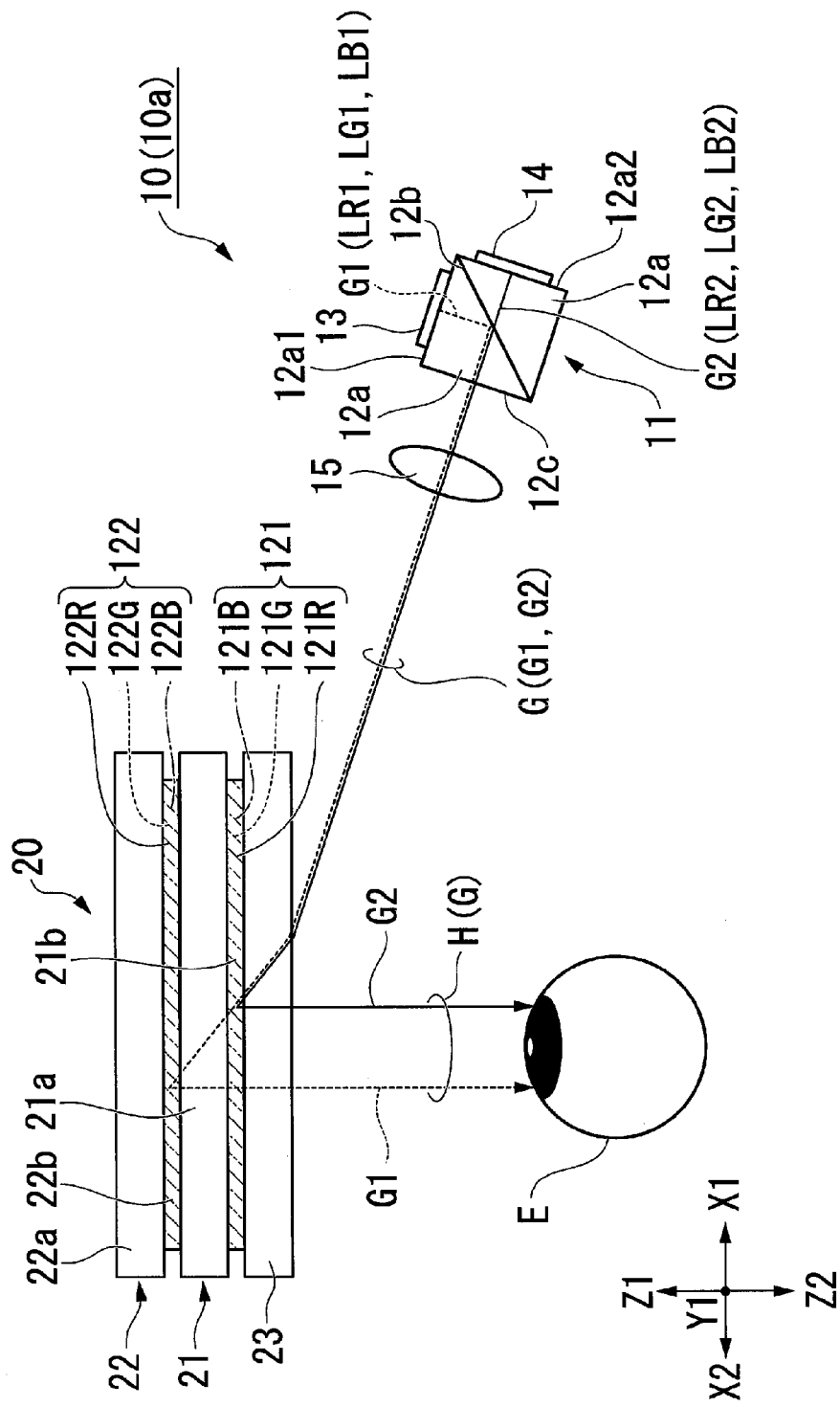
FIG. 2 is a diagram illustrating a schematic configuration of an optical system.

FIG. 1 is an external view illustrating an aspect of an external appearance of an image display device 100 of the first embodiment. FIG. 2 is an explanatory diagram illustrating an aspect of an optical system 10 of the image display device 100 illustrated in FIG. 1. Note that, as necessary in the drawings used in the following description, a front and rear direction of an observer wearing the image display device is designated as a direction along a Z axis, the front of the observer wearing the image display device is designated as a front side Z1 as one side in the front and rear direction, and the rear of the observer wearing the image display device is designated as a rear side Z2 as the other side in the front and rear direction. In addition, a left-right direction with respect to the observer wearing the image display device is designated as a direction along an X axis, one side in the left-right direction corresponding to the right direction of the observer wearing the image display device is designated as a right side X1, and the other side in the left-right direction corresponding to the left direction of the observer wearing the image display device is designated as a left side X2. Further, an up and down direction with respect to the observer wearing the image display device is designated as a direction along a Y axis, one side in the up and down direction corresponding to the up direction of the observer wearing the image display device is designated as an up side Y1, and the other side in the up and down direction corresponding to the down direction of the observer wearing the image display device is designated as a down side Y2.

The image display device 100 illustrated in FIG. 1 serves as an image display device of a head-mounted type. The image display device 100 includes an optical system for right eye 10a that allows image light L0a to enter a right eye Ea and an optical system for left eye 10b that allows image light L0b to enter a left eye Eb. The image display device 100 is formed in a glasses-like shape, for example. Specifically, the image display device 100 further includes a chassis 90 for holding both the optical system for right eye 10a and the optical system for left eye 10b. The image display device 100 is mounted onto the head of the observer by the chassis 90.

The image display device 100 includes, as the chassis 90, a frame 91, a temple 92a provided at the right side of the frame 91 and hooked on the right ear of the observer, and a temple 92b provided at the left side of the frame 91 and hooked on the left ear of the observer. The frame 91 includes storage spaces 91s on both sides of the frame 91, where the storage spaces 91s store components such as an image light projection device that constitute the optical system 10 described later. The temples 92a and 92b are coupled to the frame 91 by hinges 95 in a foldable manner.

Next, a basic configuration of the optical system 10 of the image display device 100 will be described. The optical system for right eye 10a has the same basic configuration as the optical system for left eye 10b. Thus, the optical system for right eye 10a and the optical system for left eye 10b will be simply described as the optical system 10 when no particular distinction is made in the description below.

FIG. 2 is a diagram illustrating a schematic configuration of the optical system 10. Note that FIG. 2 illustrates the optical system for right eye 10a as an example.

As illustrated in FIG. 2, the optical system 10 of the first embodiment includes an image light generation device 11 and a deflection member 20. The image light generation device 11 includes a prism unit (a combining optical member) 12, a first display panel (a first light source unit) 13, a second display panel (a second light source unit) 14, and a projection optical system 15.

The prism unit 12 includes a optical combining film 12b between a pair of triangular prisms 12a. The prism unit 12, which has a substantially square or substantially rectangular planar shape, has a first side face 12a1 and a second side face 12a2 that are orthogonal to each other. The prism unit 12 has a light emission surface 12c facing opposite to the second side face 12a2. The optical combining film 12b is constituted by a dichroic film, for example. The prism unit 12 combines first light G1 emitted from the first display panel 13 and the second light G2 emitted from the second display panel 14 to generate image light G.

The first display panel 13 is provided facing the first side face 12a1 of the prism unit 12. The second display panel 14 is provided facing the second side face 12a2 of the prism unit 12. The first display panel 13 and the second display panel 14 are constituted, for example, by a self-luminous panel such as an organic electroluminescence display element, or a liquid crystal panel formed by combining a backlight with a liquid crystal display element. Note that a laser backlight using a MEMS or the like may also be used as the backlight. The first display panel 13 and the second display panel 14 have a plurality of pixels.

The first display panel 13 is configured to emit the first light G1 from each of the pixels corresponding to image angles of the image light G. The second display panel 14 is configured to emit the second light G2 from each of the pixels corresponding to the image angles of the image light G.

The optical combining film 12b of the prism unit 12 has characteristics of reflecting the first light G1 and transmitting the second light G2.

Note that in FIG. 2, for making the drawings easily viewable, as the first light G1 emitted from the first display panel 13 and the second light G2 emitted from the second display panel 14, a light ray corresponding to a single image angle, for example, the center image angle of the image light G are illustrated.

The first light G1 is light containing red light LR1, green light LG1, and blue light LB1. The red light LR1 is light having a wavelength band ranging from 580 nm to 700 nm, the green light LG1 is light having a wavelength band ranging from 495 nm to 580 nm, and the blue light LB1 is light having a wavelength band ranging from 400 nm to 500 nm.

The first light G1 of the first embodiment is light containing the red light LR1 having a peak wavelength of 630 nm, the green light LG1 having a peak wavelength of 520 nm, and the blue light LB1 having a peak wavelength of 440 nm, for example. Note that the half widths of the red light LR1, the green light LG1, and the blue light LB1 are all 10 nm. In the first embodiment, the first light G1 emitted from the first display panel 13 is reflected by the optical combining film 12b of the prism unit 12.

The second light G2 is light containing red light LR2, green light LG2, and blue light LB2. The red light LR2 is light having a wavelength band ranging from 580 nm to 700 nm, the green light LG2 is light having a wavelength band ranging from 495 nm to 580 nm, and the blue light LB2 is light having a wavelength band ranging from 400 nm to 500 nm.

The second light G2 is light within a same frequency band as the first light G1 and having a wavelength band different from the wavelength band of the first light G1. That is, the red light LR2, the green light LG2, and the blue light LB2 of the second light G2 have peak wavelengths different from the red light LR1, the green light LG1, and the blue light LB1 of the first light G1, respectively.

Specifically, the second light G2 of the first embodiment is light containing the red light LR2 having a peak wavelength of 670 nm, the green light LG2 having a peak wavelength of 560 nm, and the blue light LB2 having a peak wavelength of 480 nm, for example. Note that the half widths of the red light LR2, the green light LG2, and the blue light LB2 are all 10 nm. In the first embodiment, the second light G2 emitted from the second display panel 14 is transmissive of the optical combining film 12b of the prism unit 12.

The first light G1 emitted from the first display panel 13 is reflected by the optical combining film 12b of the prism unit 12, to then travel toward the light emission surface 12c. The second light G2 emitted from the second display panel 14 is transmitted through the optical combining film 12b of the prism unit 12, to then travel toward the light emission surface 12c. Note that polarized light may be used for combining the first light G1 and the second light G2 at the optical combining film 12b. In this case, the first light G1 may be caused to enter, as S-polarized light, the optical combining film 12b constituted as a polarizing beam splitter, and the second light G2 may be caused to enter, as P-polarized light, the optical combining film 12b.

As illustrated in FIG. 2, the prism unit 12 is configured to at least partially superimpose the first light G1 and the second light G2 that have passed through the optical combining film 12b to generate the image light G. The prism unit 12 is configured to emit the image light G from the light emission surface 12c toward the projection optical system 15.

The projection optical system 15 is constituted by combining a plurality of free curved lenses or rotationally symmetric lenses. The projection optical system 15 is configured to emit the image light G toward the deflection member 20.

As such, the image light generation device 11 of the first embodiment is configured to emit the image light G generated by combining the first light G1 and the second light G2 that are emitted from the first display panel 13 and the second display panel 14 toward the deflection member 20. The image light G is incident on the deflection member 20 in an oblique direction.

The deflection member 20 is configured to deflect the image light G emitted from the image light generation device 11 to form an exit pupil H near an eye E of the observer. Specifically, the deflection member 20 has a structure of layering reflective diffraction elements. In the first embodiment, the deflection member 20 has a structure of layering two reflective diffraction elements. Note that in FIG. 2, the deflection member 20 is configured in a plate shape, and may also have a concave curved shape concaved away from the eye E. The deflection member 20, by employing the concave curved shape, can have a positive power for converging the image light G toward the eye E of the observer.

The deflection member 20 includes an internal surface side diffraction member (a second diffraction member) 21 disposed on a side of a light incidence surface on which the image light G is incident, an external surface side diffraction member (a first diffraction member) 22 layered on a back surface side opposite to the light incidence surface of the internal surface side diffraction member 21, and a light transmissive member 23 that covers the internal surface side diffraction member 21. That is, the internal surface side diffraction member 21 overlaps, when viewing the front side Z1 from the exit pupil H, with the external surface side diffraction member 22. Although FIG. 2 illustrates a case where the internal surface side diffraction member 21 is the same in size as the external surface side diffraction member 22, and the internal surface side diffraction member 21 may be different in size from the external surface side diffraction member 22. For example, the external surface side diffraction member 22 may be greater in size than the internal surface side diffraction member 21.

In the first embodiment, the internal surface side diffraction member 21 and the external surface side diffraction member 22 are constituted by a reflective volume hologram. The light transmissive member 23 has light transmissivity of transmitting external light.

The internal surface side diffraction member 21 includes a base material 21a and a diffraction portion 21b. Similarly, the external surface side diffraction member 22 includes a base material 22a and a diffraction portion 22b. The base material 21a, the base material 22a, and the light transmissive member 23 are composed, for example, of plastic (for example, PMMA, polycarbonate resin, acrylic resin, amorphous polypropylene resin, styrene resin containing AS resin, or the like), or glass (for example, quartz, BK7, or the like). Note that the internal surface side diffraction member 21 and the external surface side diffraction member 22 may be formed into a concave curved surface concaved away from the eye E. This allows the image light G to be efficiently converged toward the eye E of the observer.

The diffraction portion (a second diffraction element) 21b and the diffraction portion (a first diffraction element) 22b are formed, for example, of a photopolymer material, and interference fringes are formed from the interior portion to the surface. In the first embodiment, the diffraction portion 21b of the internal surface side diffraction member 21 have a wavelength different from the diffraction portion 22b of the external surface side diffraction member 22.

Specifically, the diffraction portion 21b of the internal surface side diffraction member 21 has second interference fringes 121 formed at a pitch corresponding to a wavelength band of the second light G2 emitted from the second display panel 14.

The second interference fringes 121 are formed by superimposing interference fringes 121R, 121G, and 121B that are formed at a pitch corresponding to the red light LR2, the green light LG2, and the blue light LB2 that are contained in the second light G2. For example, the interference fringes 121R are formed at a pitch corresponding to light of 670 nm, which is the peak wavelength of the red light LR2. The interference fringes 121G are formed at a pitch corresponding to light of 560 nm, which is the peak wavelength of the green light LG2. The interference fringes 121B are formed at a pitch corresponding to light of 480 nm, which is the peak wavelength of the blue light LB2. The second interference fringes 121 can be formed, in a state of forming a holographic photosensitive layer having sensitivity corresponding to the respective wavelengths of the red light LR2, the green light LG2, and the blue light LB2, by performing interference exposure on the holographic photosensitive layer by using reference light and object light that correspond to the respective wavelengths.

According to the internal surface side diffraction member 21 of the first embodiment, the red light LR2, the green light LG2, and the blue light LB2 that are contained in the second light G2 can be deflected to enter the eye E of the observer. In addition, the internal surface side diffraction member 21 of the first embodiment is configured to transmit light having a wavelength band different from a wavelength of the second light G2 in the external light.

Further, the diffraction portion 22b of the external surface side diffraction member 22 has first interference fringes 122 formed at a pitch corresponding to a wavelength band of the first light G1 emitted from the first display panel 13.

The first interference fringes 122 are formed by superimposing interference fringes 122R, 122G, and 122B that are formed at a pitch corresponding to the red light LR1, the green light LG1, and the blue light LB1 that are contained in the first light G1. For example, the interference fringes 122R are formed at a pitch corresponding to light of 630 nm, which is the peak wavelength of the red light LR1. The interference fringes 122G are formed at a pitch corresponding to light of 520 nm, which is the peak wavelength of the green light LG1. The interference fringes 122B are formed at a pitch corresponding to light of 440 nm, which is the peak wavelength of the blue light LB1. The first interference fringes 122 can be formed, in a state of forming a holographic photosensitive layer having sensitivity corresponding to the respective wavelengths of the red light LR2, the green light LG2, and the blue light LB2, by performing interference exposure on the holographic photosensitive layer by using reference light and object light that correspond to the respective wavelengths.

According to the external surface side diffraction member 22 of the first embodiment, the red light LR1, the green light LG1, and the blue light LB1 that are contained in the first light G1 can be deflected to enter the eye E of the observer. The external surface side diffraction member 22 of the first embodiment is also configured to transmit light having a wavelength band different from the wavelength band of the first light G1 in the external light.

Accordingly, the internal surface side diffraction member 21 and the external surface side diffraction member 22 cause the image light G to be efficiently converged into the eye E of the observer, and have see-through properties of transmitting the external light.

Thus, the deflection member 20 of the first embodiment can cause the observer to recognize an image formed by superimposing the image light G on the external light (background) formed at the image light generation device 11.

Next, functions and advantageous effects of the deflection member 20 will be described.

As illustrated in FIG. 2, when the image light G is incident on the deflection member 20, the image light G is refracted by the light transmissive member 23 to enter the internal surface side diffraction member 21. As described above, the diffraction portion 21b of the internal surface side diffraction member 21 has the second interference fringes 121 corresponding to the wavelength bands of the red light LR2, the green light LG2, and the blue light LB2 that are contained in the second light G2. Accordingly, the second light G2 included in the image light G is diffracted by the diffraction portion 21b of the internal surface side diffraction member 21 to be emitted toward the eye E of the observer. On the other hand, the first light G1 contained in the image light G is not diffracted by the diffraction portion 21b, thus the first light G1 is transmitted through the internal surface side diffraction member 21.

In the deflection member 20 of the first embodiment, the external surface side diffraction member 22 overlaps, when viewing the front side Z1 from the exit pupil H, with the internal surface side diffraction member 21. Accordingly, the first light G1 transmitted through the internal surface side diffraction member 21 is incident on the external surface side diffraction member 22.

Specifically, the first light G1 is transmitted through the base material 21a of the internal surface side diffraction member 21 to reach the external surface side diffraction member 22. As described above, the diffraction portion 22b of the external surface side diffraction member 22 has first interference fringes 122 corresponding to the wavelength bands of the red light LR1, the green light LG1, and the blue light LB1 that are contained in the first light G1. Accordingly, the first light G1 is diffracted by the diffraction portion 22b of the external surface side diffraction member 22 to be emitted toward the eye E of the observer. The first light G1 diffracted by the diffraction portion 22b is transmitted through the internal surface side diffraction member 21. In the first embodiment, the second interference fringes 121 of the diffraction portion 21b of the internal surface side diffraction member 21 correspond to the wavelength band of the second light G2, and thus the second interference fringes 121 does not act on the first light G1 having a different wavelength band. This suppresses the occurrence of a ghost caused by the diffraction when the first light G1 is transmitted through the internal surface side diffraction member 21.

In the deflection member 20 of the first embodiment, diffraction positions at which the first light G1 and the second light G2 that are contained in the image light G are diffracted differ from each other. That is, the first light G1 travels, inside the base material 21a, obliquely with respect to a thickness direction of the base material 21a to be diffracted at the front side Z1 of the second light G2. Accordingly, the diffraction position at which the first light G1 is diffracted is displaced to the left side X2 by an optical path length that the first light G1 is transmitted through the base material 21a with respect to the diffraction position at which the second light G2 is diffracted.

According to the deflection member 20 of the first embodiment, the second light G2 diffracted by the internal surface side diffraction member 21 and the first light G1 diffracted by the external surface side diffraction member 22 are separated in the left-right direction, and the first light G1 and the second light G2 are emitted toward the eye E in a state of being parallel to each other, to thus form the exit pupil H of the image light G. The first light G1 and the second light G2 are separated in the left-right direction, thus the image light G having been deflected by the deflection member 20 comes into a state where a luminous flux width of the image light G, that is, a size of the exit pupil H formed by the image light G is expanded.

Note that in FIG. 2, only the light ray corresponding to the center image angle of the image light G are illustrated as the first light G1 and the second light G2, and the same relationship as this holds true for light rays corresponding to other image angles of the image light G. That is, according to the optical system 10 of the first embodiment, the exit pupil H can be expanded in width at the entire image angle of the image light G.

The optical system 10 of the first embodiment, when causing the image light G emitted from the image light generation device 11 to travel along a horizontal plane (an XZ plane) to be guided to the eye E of the observer, can expand the size of the exit pupil H in the left-right direction.

As described above, according to the optical system 10 of the first embodiment, the diffraction positions at which the first light G1 and the second light G2 are diffracted, which correspond to a single image angle of the image light G are caused to differ in a thickness direction of the deflection member 20, to thus expand the width of the exit pupil H of the image light G.

The image light generation device 11 of the first embodiment, which is constituted by the first display panel 13, the second display panel 14, the prism unit 12, and the projection optical system 15, helps suppress the device configuration from growing in size in the optical system 10, compared to when forming a plurality of the exit pupils using a large number of laser light sources.

According to the optical system 10 of the first embodiment, a spacing between the first light G1 and the second light G2 is widened to expand the exit pupil H, thus preventing the occurrence of a distortion of the image light, unlike when forming the plurality of the exit pupils using the large number of laser light sources. Accordingly, the optical system 10 of the first embodiment can avoid the need for performing a complicated processing such as a correction of the distortion of the image light G. Thus, in the optical system 10 of the first embodiment, an installing of a large-scale CPU to perform processing of the image light generation device 11 does not cause the device configuration to grow in size.

Consequently, according to the image display device 100 of the first embodiment, the exit pupil H can be expanded in size while suppressing the device configuration from growing in size.

Second Embodiment

Next, an optical system according to the second embodiment will be described. Note that components common to the first embodiment will be given identical reference signs and detailed description of these will be omitted.

Figure 3:
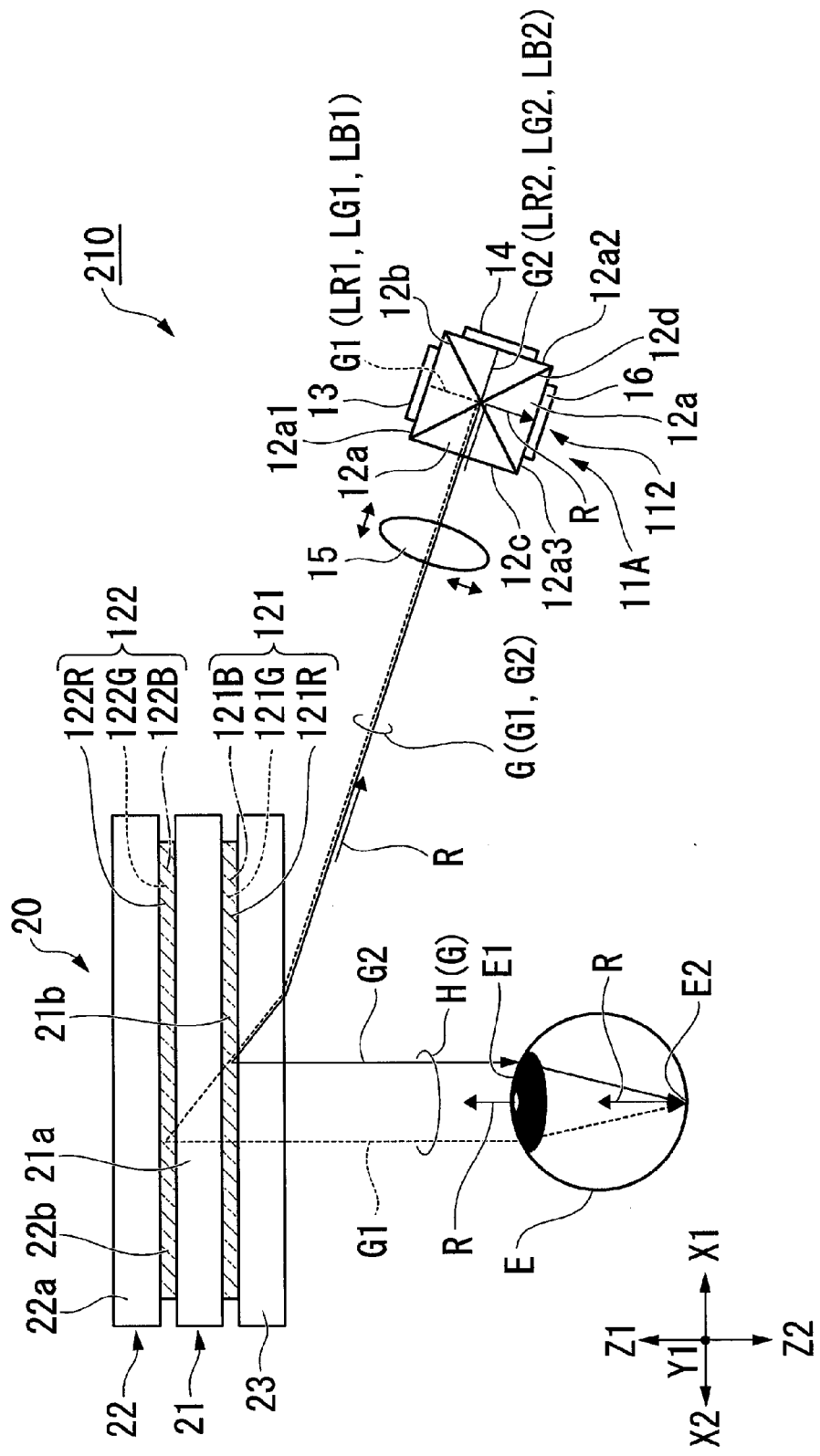
FIG. 3 is a diagram illustrating a configuration of an optical system of a second embodiment.

FIG. 3 is a diagram illustrating a configuration of an optical system according to the second embodiment. As illustrated in FIG. 3, an optical system 210 of the second embodiment includes an image light generation device 11A and the deflection member 20. The image light generation device 11A includes a prism unit 112, the first display panel 13, the second display panel 14, the projection optical system 15, and a detector 16.

The prism unit 112 includes four triangular prisms 12a and the optical combining film 12b and a dichroic mirror 12d that are provided in a manner crossing between the triangular prisms 12a when viewed in plan view. The prism unit 112, which has a substantially square planar shape, has the first side face 12a1 and the second side face 12a2 that are orthogonal to each other, a third side face 12a3 orthogonal to the second side face 12a2, and the light emission surface 12c facing opposite to the second side face 12a2. The dichroic mirror 12d has characteristics of transmitting both the first light G1 and the second light G2 and reflecting detection light described later.

The prism unit 112 is configured to combine the first light G1 emitted from the first display panel 13 and the second light G2 emitted from the second display panel 14 to generate the image light G.

The detector 16 is provided facing the third side face 12a3 of the prism unit 112. The detector 16 serves as a sensor configured to detect light emitted from the eye E of the observer disposed near the exit pupil H.

The detector 16 is configured to emit light toward the eye E of the observer and to detect the light reflected by the eye E. That is, the detector 16 is configured to detect the light emitted from the exit pupil H. For example, the detection light emitted from the detector 16 to enter the eye E of the observer is reflected by a corneal surface E1 of the eye E. Reflected detection light R reflected by the corneal surface E1 travels through an optical path opposite to the image light G, to reach the prism unit 112. The reflected detection light R being incident on the prism unit 112 is reflected by the dichroic mirror 12d and enters the detector 16. The detector 16 is configured to detect a position of the eye E of the observer based on a detection result of the reflected detection light R. For example, the detector 16 is configured to move a position of the projection optical system 15 based on the detection result to change a traveling direction in which the image light G travels, thus allowing the image light G to efficiently enter the eye E of the observer.

The detector 16 may also be configured to detect the reflected detection light R reflected by a retina E2 of the eye E of the observer.

In the optical system 210 of the second embodiment, an optical path length of the reflected detection light R emitted from the exit pupil H (the eye E of the observer) and entering the detector 16 is equal to optical path lengths of the first light G1 and the second light G2 that are emitted from the first display panel 13 and the second display panel 14 and enter the eye E of the observer.

Accordingly, an image of the reflected detection light R that forms an image on the detector 16 is the same as images of the first light G1 or the second light G2, which forms an image on the retina E2. Thus, the detector 16 can detect the reflected detection light R to detect an image forming state of the first light G1 or the second light G2 on the retina E2. The detector 16 can detect a degree of blur of the image light G, and thus, for example, the detector 16, by moving the position of the projection optical system 15, can adjust the image to be clearly viewed to the observer.

Note that in the above description, an example is given of a case where the reflected detection light R of the detection light emitted from the detector 16 is used, and the image light G (the first light G1 and the second light G2) reflected by the eye E of the observer may also be used as the detection light.

According to the optical system 210 of the second embodiment, the detector 16 can detect the position of the eye E of the observer and the degree of blur on the retina E2, thus allowing the image light G having higher quality to be viewed by the observer.

Third Embodiment

Next, an optical system according to the third embodiment will be described. Note that components common to the first embodiment will be given identical reference signs and detailed description of these will be omitted.

Figure 4:
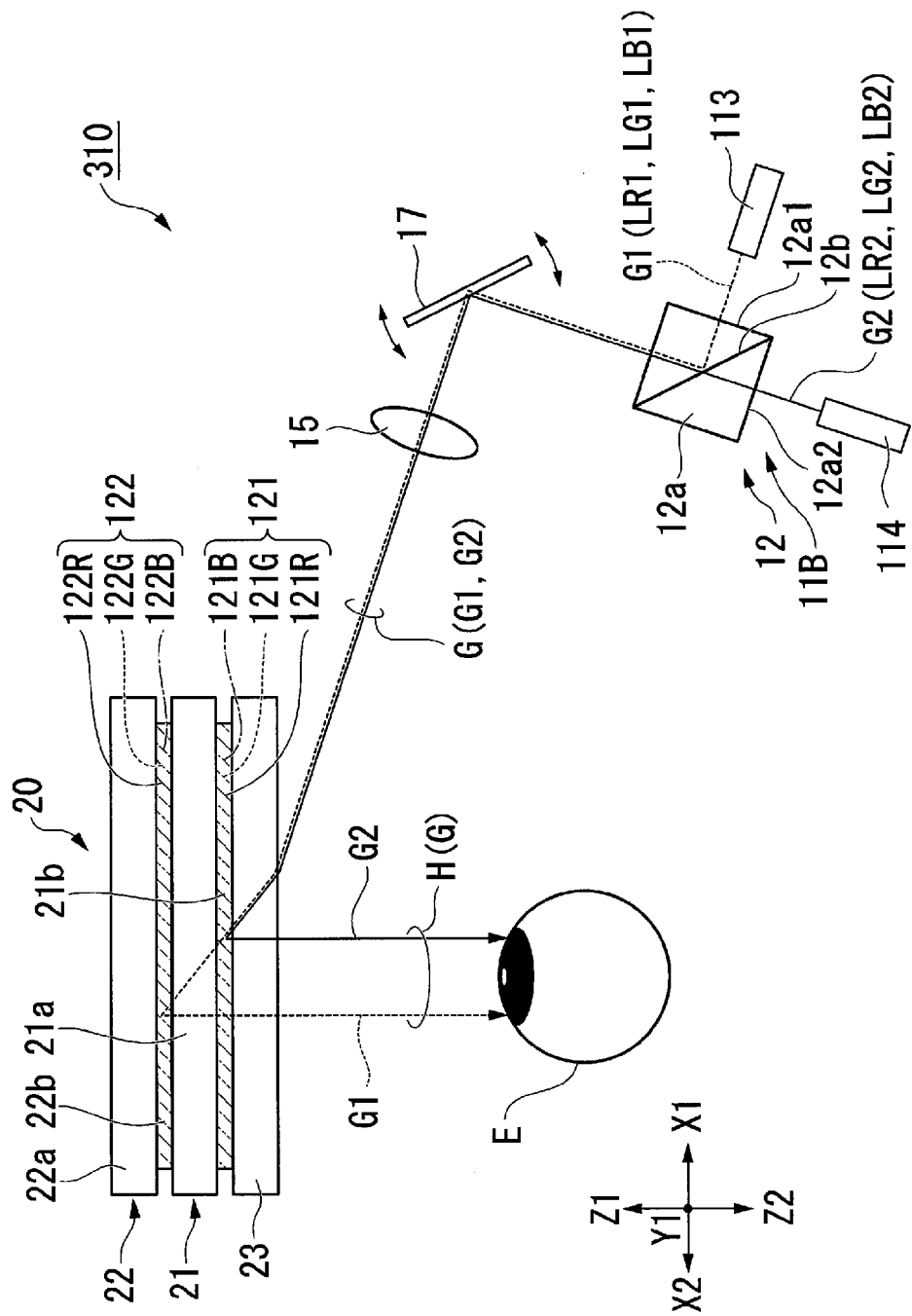
FIG. 4 is a diagram illustrating a configuration of an optical system of a third embodiment.

FIG. 4 is a diagram illustrating a configuration of an optical system according to the third embodiment. As illustrated in FIG. 4, an optical system 310 of the third embodiment includes an image light generation device 11B and the deflection member 20. The image light generation device 11B includes the prism unit 12, a first light source unit 113, a second light source unit 114, a MEMS mirror 17, and the projection optical system 15.

The first light source unit 113 is provided facing the first side face 12a1 of the prism unit 12. The second light source unit 114 is provided facing the second side face 12a2 of the prism unit 12. In the third embodiment, the first light source unit 113 and the second light source unit 114 are constituted by a laser light source configured to emit laser light of RGB colors. That is, the third embodiment is different from the first embodiment in that the first light G1 and the second light G2 emitted from the first light source unit 113 and the second light source unit 114 serve as laser light. Note that in FIG. 4, as the first light G1 emitted from the first light source unit 113 and the second light G2 emitted from the second light source unit 114, the light ray corresponding to a single image angle, for example, the center image angle of the image light G is illustrated.

The prism unit 12 is configured to combine the first light G1 emitted from the first light source unit 113 and the second light G2 emitted from the second light source unit 114.

The MEMS mirror 17 is constituted by a micromirror. The MEMS mirror 17 is configured to rotate about a predetermined rotation axis to control a reflection direction of the combined light of the first light G1 and the second light G2 that are emitted from the prism unit 12. The image light generation device 11B of the third embodiment is configured to cause the MEMS mirror to scan the combined light of the first light G1 and the second light G2 to generate the image light G corresponding to the image angles.

According to the optical system 310 of the third embodiment, even with a structure of combining the first light source unit 113 and the second light source unit 114 that are composed of a laser light source, with the MEMS mirror 17, the exit pupil can be expanded in size while suppressing the device from growing in size.

Fourth Embodiment

Next, an optical system according to the fourth embodiment will be described. The optical system of the fourth embodiment has a configuration of combining the second embodiment with the third embodiment. Note that components common to the above-described embodiments will be given identical reference signs and detailed description of these will be omitted.

Figure 5:
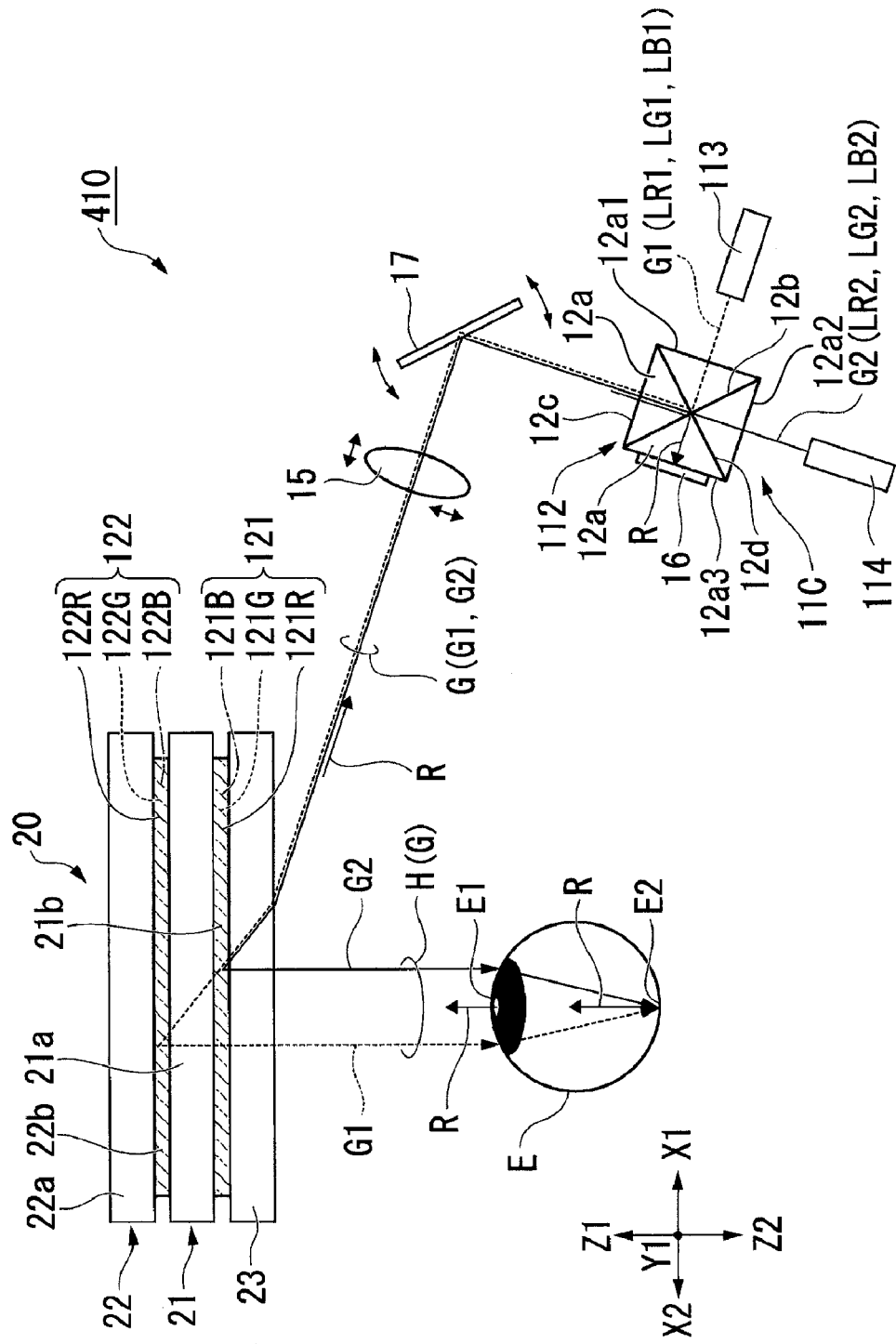
FIG. 5 is a diagram illustrating a configuration of an optical system of a fourth embodiment.

FIG. 5 is a diagram illustrating a configuration of an optical system according to the fourth embodiment. As illustrated in FIG. 5, an optical system 410 of the fourth embodiment includes an image light generation device 11C and the deflection member 20. The image light generation device 11C includes the prism unit 112, the first light source unit 113, the second light source unit 114, the MEMS mirror 17, the projection optical system 15, and the detector 16.

The first light source unit 113 is provided facing the first side face 12a1 of the prism unit 112. The second light source unit 114 is provided facing the second side face 12a2 of the prism unit 112. The detector 16 is provided facing the third side face 12a3 of the prism unit 112.

According to the optical system 410 of the fourth embodiment, in the structure of combining the laser light source with the MEMS mirror 17 to generate the image light G, the detector 16 is caused to detect the position of the eye E of the observer, that is, a position of the corneal surface E1 or the degree of blur on the retina E2, thus allowing the image light G having higher quality to be viewed.

In FIG. 5, the reflected detection light R is transmitted through the center portion of the prism unit 112 composed of a cross prism, where a gap may occur at the center portion of the cross prism. Accordingly, the reflected detection light R may be caused to pass through a position shifted from the center portion of the prism unit 112 to enter the detector 16.

Note that when using the laser light as the image light G as in the fourth embodiment, the shape of the prism unit 112 is not limited to the above-described embodiments.

Figure 6:
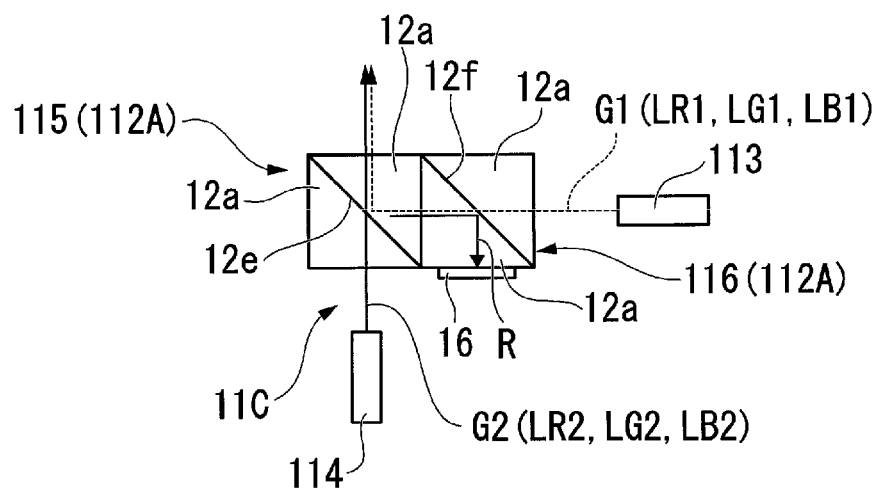
FIG. 6 is a diagram illustrating a structure of a prism unit according to a modified example of a fourth embodiment.

FIG. 6 is a diagram illustrating a structure of a prism unit 112A according to a modified example. As illustrated in FIG. 6, the prism unit 112A may be configured by bonding a first prism 115 and a second prism 116 together. The first prism 115 has a structure provided with a dichroic mirror 12e between the pair of triangular prisms 12a. The dichroic mirror 12e has characteristics of reflecting the first light G1 and transmitting the second light G2. The second prism 116 has a structure provided with a half mirror 12f between the pair of triangular prisms 12a.

The prism unit 112A having the structure according to the modified example is configured by bonding two prisms having a simple shape together, compared to the cross prism that constitutes the above-described prism unit 112. This improves the assembly accuracy when manufacturing the prism unit, to thus provide the prism unit 112A with high accuracy while achieving cost reduction.

Fifth Embodiment

Next, an optical system according to the fifth embodiment will be described. Note that components common to the first embodiment will be given identical reference signs and detailed description of these will be omitted.

Figure 7:
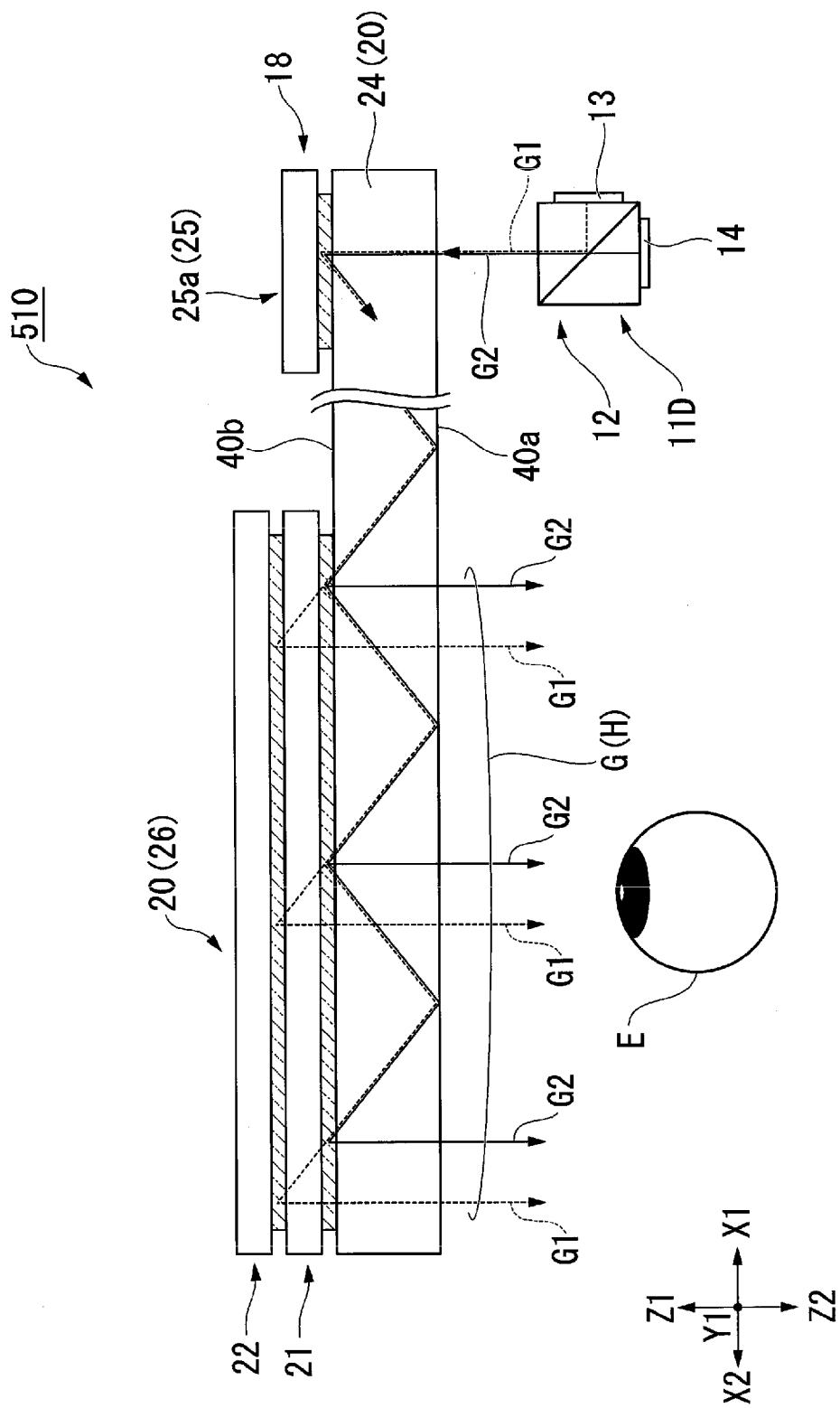
FIG. 7 is a diagram illustrating a configuration of an optical system according to a fifth embodiment.

FIG. 7 is a diagram illustrating a configuration of an optical system according to the fifth embodiment. As illustrated in FIG. 7, an optical system 510 of the fifth embodiment includes an image light generation device 11D, a light-guiding portion 18, and the deflection member 20. The image light generation device 11D includes the prism unit 12, the first display panel 13, and the second display panel 14. That is, the image light generation device 11D of the fifth embodiment includes the light-guiding portion 18 in place of the projection optical system 15.

In the fifth embodiment, the image light G emitted from the image light generation device 11D is incident on the light-guiding portion 18. The light-guiding portion 18 includes a light-guiding body 24, a light incidence portion 25, and a light emission portion 26. The light-guiding body 24 includes a parallel light-guiding plate 40 of a plate-like shape extending in the left-right direction of the observer. The parallel light-guiding plate 40 includes a pair of a first surface 40a and a second surface 40b that are parallel to each other. The first surface 40a and the second surface 40b are configured to function as a totally reflecting surface for totally reflecting the image light G propagating inside, and to guide the image light G to the light emission portion 26 with less loss.

The light incidence portion 25 is for capturing the image light G into the inside of the light-guiding body 24, and the light emission portion 26 is for extracting the image light G traveling inside the light-guiding body 24 to the outside. The light incidence portion 25 is constituted by a diffractive optical element 25a of a plate-like shape affixed to one end side of the second surface 40b of the parallel light-guiding plate 40. The diffractive optical element 25a is constituted by the reflective volume hologram. Note that the diffractive optical element 25a may be constituted by a surface relief diffractive element, for example, a blazed diffraction grating.

The deflection member 20 is provided at the light emission portion 26. In the fifth embodiment, the deflection member 20 is provided directly at the second surface 40b of the parallel light-guiding plate 40, and thus the light transmissive member 23 is omitted.

The optical system 510 of the fifth embodiment can cause the deflection member 20 to correct a color deviation caused by a difference in diffraction angle occurring depending on the wavelength at the diffractive optical element 25a provided at the light incidence portion 25. Note that the diffractive optical element 25a may be omitted as necessary.

The image light G propagating inside the light-guiding body 24 propagates along the lengthwise direction of the deflection member 20 by total internal reflection of the light-guiding body 24. In addition, zero-order light is transmitted through, at a plurality of locations, the internal surface side diffraction member 21 and first-order light is reflected by the external surface side diffraction member 22, and thus the image light G is emitted toward the eye E of the observer in a state where the first light G1 and the second light G2 are separated in the left-right direction.

According to the optical system 510 of the fifth embodiment, the exit pupil H can be efficiently expanded in size by a synergistic effect of a total reflection inside the light-guiding body 24 and an expansion of a light ray width of the deflection member 20.

The light-guiding body 24 of the fifth embodiment is constituted by the parallel light-guiding plate 40, and the light-guiding body 24 may also have a curved shape. When the light-guiding body 24 has the curved shape as such, the effect of widening the light ray width due to a plurality of the total reflections is not achieved unlike the parallel light-guiding plate 40. Even when using the light-guiding body 24 having the curved shape as such, the exit pupil H can be expanded in size by providing the deflection member 20 at the light emission portion 26.

Note that the configuration of the optical system 510 of the fifth embodiment may be combined with the configuration of the second embodiment. That is, the prism unit 12 of the image light generation device 11D may be replaced by the prism unit 112 including the detector 16 illustrated in FIG. 3.

Further, the configuration of the optical system 510 of the fifth embodiment may be combined with the configuration of the third embodiment. That is, the image light generation device 11D may be replaced by the image light generation device 11B illustrated in FIG. 4.

Further, the configuration of the optical system 510 of the fifth embodiment may be combined with the configuration of the fourth embodiment. That is, the image light generation device 11D may be replaced by the image light generation device 11C illustrated in FIG. 5.

Further, in the configurations of the above-described first to fourth embodiments, the image light G may be caused to enter the deflection member 20 via the diffractive optical element 25a. In this case as well, the deflection member 20 can correct the color deviation caused by the difference in diffraction angle occurring depending on the wavelength at the diffractive optical element 25a.

Note that the present disclosure is not limited to the aspects of the above-described embodiments, and various modifications can be appropriately made to the above-described embodiments within a scope not departing from the gist of the present disclosure. In the above-described embodiments and modified examples, an example is given of a case where the external surface side diffraction member 22 and the internal surface side diffraction member 21 that constitute the deflection member 20 are layered, however, the external surface side diffraction member 22 and the internal surface side diffraction member 21 may be disposed in a manner spaced apart from each other. That is, a gap may be provided between the external surface side diffraction member 22 and the internal surface side diffraction member 21.

In addition, in the above-described embodiments and modified examples, an example is given of a case when causing the image light G emitted from the image light generation device to travel along the horizontal plane to be guided to the eye E of the observer, however, the optical system of an aspect of the present disclosure can also be applicable when causing the image light G to travel along the vertical plane to be guided to the eye E of the observer. In this case, the optical system of an aspect of the present disclosure may be expanded in size of the exit pupil H in the up and down direction. Further, the optical system of an aspect of the present disclosure can also be applicable when causing the image light G to travel along a plane intersecting the vertical plane to be guided to the eye E of the observer. In this case, the optical system of an aspect of the present disclosure can be expanded in size of the exit pupil H in an oblique direction intersecting both the up and down direction and the left-right direction.

Application to Other Image Display Device

In the above-described embodiments, the image display device 100 of a head-mounted type is exemplified, and the present disclosure may also be applied to a head-up display, a handheld display, and the like.

What is claimed is:

1. An image display device, comprising:
an image light generation device configured to generate image light; and
a deflection member of a reflective-type configured to deflect the image light emitted from the image light generation device to form an exit pupil, wherein
the image light generation device includes
a first light source unit configured to emit first light, wherein the first light comprises first red light, first green light, and first blue light,
a second light source unit configured to emit second light that is within a same frequency band as the first light, wherein the second light comprises second red light, second green light, and second blue light that have peak wavelengths respectively different from the first red light, the first green light, and the first blue light, and
a combining optical member configured to at least partially superimpose the first light and the second light, the deflection member includes
a first diffraction member including a first diffraction element corresponding to the wavelength band of the first light and
a second diffraction member including a second diffraction element corresponding to the wavelength band of the second light, and
the first diffraction member and the second diffraction member overlap when viewed from the exit pupil.

2. The image display device according to claim 1, wherein the first light diffracted by the first diffraction member and the second light diffracted by the second diffraction member are emitted in a state of being separated from each other and parallel to each other to form the exit pupil.

3. The image display device according to claim 1, wherein the first diffraction element and the second diffraction element are constituted by a reflective volume hologram.

4. The image display device according to claim 1, wherein the image light generation device includes a detector provided at the combining optical member and configured to detect light emitted from the exit pupil.

5. The image display device according to claim 4, wherein an optical path length of the light emitted from the exit pupil and entering the detector is equal to optical path lengths of the first light and the second light that are emitted from the first light source unit and the second light source unit and enter the exit pupil.

6. The image display device according to claim 1, wherein the first light source unit and the second light source unit are constituted by a display panel.

7. The image display device according to claim 1, wherein the first light source unit and the second light source unit are constituted by a laser light source, and the image light generation device includes a MEMS mirror configured to scan the image light.

8. The image display device according to claim 1, further comprising
a light-guiding body configured to guide the image light to the deflection member.

9. An image display device, comprising:
an image light generation device configured to generate image light; and
a deflection member of a reflective-type configured to deflect the image light emitted from the image light generation device to form an exit pupil, wherein
the image light generation device includes
a first light source unit configured to emit first light,
a second light source unit configured to emit second light that is within a same frequency band as the first light and has a wavelength band different from a wavelength band of the first light,
a combining optical member configured to at least partially superimpose the first light and the second light, and
a detector provided at the combining optical member and configured to detect light emitted from the exit pupil, the deflection member includes
a first diffraction member including a first diffraction element corresponding to the wavelength band of the first light and
a second diffraction member including a second diffraction element corresponding to the wavelength band of the second light, and the first diffraction member and the second diffraction member overlap when viewed from the exit pupil.

* * * * *